(12) United States Patent
Gouget et al.

(10) Patent No.: US 11,336,429 B2
(45) Date of Patent: May 17, 2022

(54) METHOD FOR PROTECTING A SOURCE OF ENTROPY USED IN COUNTERMEASURES SECURING A WHITE-BOX CRYPTOGRAPHIC ALGORITHM

(71) Applicant: THALES DIS FRANCE SA, Meudon (FR)

(72) Inventors: Aline Gouget, Meudon (FR); Jan Vacek, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 72 days.

(21) Appl. No.: 16/766,878

(22) PCT Filed: Nov. 28, 2018

(86) PCT No.: PCT/EP2018/082850
§ 371 (c)(1),
(2) Date: May 26, 2020

(87) PCT Pub. No.: WO2019/106016
PCT Pub. Date: Jun. 6, 2019

(65) Prior Publication Data
US 2020/0328876 A1 Oct. 15, 2020

(30) Foreign Application Priority Data

Nov. 30, 2017 (EP) .................... 17306665

(51) Int. Cl.
*H04L 9/06* (2006.01)
*H04L 9/00* (2022.01)
(52) U.S. Cl.
CPC ............ *H04L 9/0618* (2013.01); *H04L 9/002* (2013.01); *H04L 9/0662* (2013.01); *H04L 2209/16* (2013.01)

(58) Field of Classification Search
CPC ..... H04L 9/0618; H04L 9/002; H04L 9/0662; H04L 9/003; H04L 2209/16
See application file for complete search history.

(56) References Cited

U.S. PATENT DOCUMENTS

| 8,422,668 B1 * | 4/2013 | Thichina | G06F 7/76 714/755 |
| 2005/0232430 A1 * | 10/2005 | Gebotys | H04L 9/003 380/286 |

(Continued)

OTHER PUBLICATIONS

PCT/EP2018/082850, International Search Report, dated Dec. 5, 2018, European Patent Office, P.B. 5818 Patentlaan 2 NL—2280 HV Rijswijk.

(Continued)

*Primary Examiner* — Vu V Tran
(74) *Attorney, Agent, or Firm* — The Jansson Firm; Pehr B. Jansson

(57) ABSTRACT

The present invention relates to a method for a secure execution of a whitebox cryptographic algorithm applied to a message (m) and protected by countermeasures based on pseudo-random values, comprising the steps of:
 executing a pseudo-random function (PRP) generating pseudo-random output values and an encrypted main output value based on an encrypted input value (*Xi*) derived from said message,
 securing said cryptographic algorithm by applying to the cryptographic algorithm said countermeasures based on said generated pseudo-random output values
 retrieving, from said generated encrypted main output value, the input value or part of the input value, under an encrypted form (*Xi*),
 executing said secured cryptographic algorithm on said encrypted retrieved value.

19 Claims, 1 Drawing Sheet

(56) References Cited

U.S. PATENT DOCUMENTS

| | | | |
|---|---|---|---|
| 2009/0323956 A1* | 12/2009 | Tsunoo | H04L 9/065 380/268 |
| 2015/0110266 A1* | 4/2015 | Debraize | H04L 9/3242 380/30 |
| 2015/0270951 A1* | 9/2015 | Michiels | H04L 63/1466 380/28 |
| 2017/0033921 A1* | 2/2017 | Michiels | G06F 21/14 |
| 2017/0126396 A1 | 5/2017 | Moon et al. | |
| 2017/0195117 A1* | 7/2017 | Wu | H04L 9/14 |
| 2018/0287779 A1* | 10/2018 | Lee | H04L 9/003 |

OTHER PUBLICATIONS

PCT/EP2018/082850, Written Opinion of the International Searching Authority, dated Dec. 5, 2018, European Patent Office, D-80298 Munich, Germany.

\* cited by examiner

METHOD FOR PROTECTING A SOURCE OF ENTROPY USED IN COUNTERMEASURES SECURING A WHITE-BOX CRYPTOGRAPHIC ALGORITHM

FIELD OF THE INVENTION

The present invention relates to the field of software security and more particularly to randomization methods and devices to simulate a source of entropy used in countermeasures securing a cryptographic algorithm in a white-box environment.

BACKGROUND OF THE INVENTION

Traditionally, in order to ensure that a secret key used in a cryptographic algorithm remains secret and well protected, the implementation of the algorithm is supposed to be executed in a secure environment only. The device executing such an implemented algorithm is assumed to be trusted, preventing any attacker trying to retrieve the secret key from accessing or easily modifying intermediate values that are computed during the execution. This is referred to as black box cryptography or grey box cryptography, depending on the model.

However, cryptographic processes are more and more deployed in applications executed on open devices, or executed without relying on a tamper-resistant hardware module to protect their execution.

Cryptographic processes are then executed in an environment where not all users or devices can be trusted. Such a context is usually called a white-box attack context. In such a context, cryptographic sensitive data such as private keys are vulnerable to attacks since the attacker has full access to the software implementation of the cryptographic processes. Binary code of such processes is completely accessible and editable by the attacker that can analyze the binary code of the cryptography application and, for example, memory pages or registers used for temporary storage during the execution. Such manipulations may, for example, be performed using debuggers and hardware emulation tools.

Software implementations of cryptosystems able to resist white-box attacks have been sought. In such implementations, whitebox countermeasures, such as randomizing some operations using masks, are applied in order to make it more difficult for an attacker to retrieve any secret information. For example pseudo-random masks may be used for randomizing Look Up Tables (LUTs) used in a block-cipher algorithm. Whitebox countermeasures often require using a source of entropy, such as a Pseudo-Random Number Generator (PRNG), for generating such pseudo-random values in a way that remains not easy to understand and to predict by any attacker. Such a randomization process simulating a source of entropy needs to be initialized, preferably with a dynamic value that changes over time, in order to keep countermeasures efficient even if an attacker discovers one initialization value at a given time. Consequently, such a source of entropy is often initialized based on the input message to the cryptographic algorithm.

A problem is that an attacker in a white-box context may modify the initialization of such a source of entropy in such a way that it is always initialized using the same value, independently of the input message of the cryptographic algorithm. In such a case, countermeasures use the same pseudo-random values at any execution of the algorithm and an attacker may easily cancel such protections by performing a Differential Computational Analysis attack.

Therefore, there is a need for a method, and an associated cryptographic device, enabling to secure the simulation of a source of entropy used for countermeasures protecting a cryptographic process in a white-box environment.

SUMMARY OF THE INVENTION

For this purpose and according to a first aspect, this invention therefore relates to a method for a secure execution of a whitebox cryptographic algorithm applied to a message and protected by countermeasures based on pseudo-random values, comprising the steps of:

executing a pseudo-random function generating pseudo-random output values and an encrypted main output value based on an encrypted input value derived from said message, securing said cryptographic algorithm by applying to the cryptographic algorithm said countermeasures based on said generated pseudo-random output values, retrieving, from said generated encrypted main output value, the input value or part of the input value, under an encrypted form, executing said secured cryptographic algorithm on said encrypted retrieved value.

It enables to make the input of the cryptographic algorithm depend on the execution of the function generating the values used for the countermeasures, and thus to modify the execution of the cryptographic algorithm when the initialization of this function is modified, such that an attacker cannot retrieve secret information by a low order DCA attack.

Said cryptographic algorithm may be based on a block-cipher algorithm.

Said whitebox cryptographic algorithm may comprise at least one operation implemented using at least one encoded lookup table and said encrypted retrieved value may be encrypted using an encoding corresponding to the encoding of said encoded lookup tables.

Securing said cryptographic algorithm may comprise randomizing at least one of said lookup tables using said pseudo-random output values as masking values.

Said pseudo-random output values and said main output value may be also generated by the pseudo-random function based on at least one intermediate value obtained during a previous execution of the cryptographic algorithm.

It enables to make the behavior of the pseudo-random function that is combined with the processing of the input value that is the input to the cryptographic algorithm mixed together and then less predictable by the attacker. In particular, it becomes very difficult to know the value of the input to the cryptographic algorithm when attempting to modify the normal behavior of the pseudo-random function.

Executing said pseudo-random function may comprise several executions of an update function, at least one of said pseudo-random output values being an output of said update function, and said encrypted main output value being an output of the last execution of the update function.

In a first embodiment, said update function is an encryption function or a corresponding decryption function, executing said pseudo random function comprises several executions of said encryption function using various keys in a specific order followed by as many executions of said corresponding decryption function using said keys in a reverse order.

Such an execution of encryptions and corresponding decryptions enables to obtain at the end of the pseudo-random function execution the input value, or a part of it, to be provided to the cryptographic algorithm.

In a second embodiment, a master secret is split into secret shares such that adding said master secret is equivalent to the identity operation, said update function comprises adding one of said secret shares, and, each execution of the update function uses one of the secret shares such that all the secret shares are used once.

Thus, performing additions with all the secret shares provides at the end of the pseudo-random function execution the input value, or a part of it, to be provided to the cryptographic algorithm.

In a third embodiment, said update function generates an output comprising a result of applying the identity function to a part of its input, and comprising a result of an encryption of its input using an encryption key.

Thus, after any number of execution of the update function, the main output value always contains the input value, or a part of it, to be provided to the cryptographic algorithm According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to a device comprising a memory, an interface and a processor configured to perform the steps of the method according to the first aspect.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

According to a first aspect, the invention relates to a method for securing the execution in a white-box context of a cryptographic algorithm protected by countermeasures based on pseudo-random values or randomization techniques.

Figure 1:
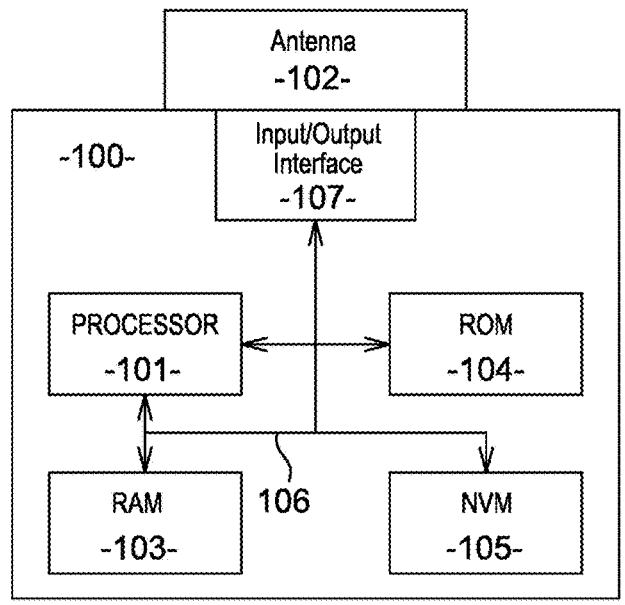
FIG. 1 is a schematic illustration of a client device according to an embodiment of the present invention.

The cryptographic algorithm, and the steps of the method, are executed by a computing device 100 whose schematic illustration is shown on FIG. 1. The computing device may include a processor 101 connected via a bus 106 to a random access memory (RAM) 103, a read-only memory (ROM) 104, and/or a non-volatile memory (NVM) 105. The computing device may further include a network interface (102) by which the client device may be connected to various wireless networks, e.g., wide-area networks, WiFi networks, or mobile telephony networks. Alternatively, the computing device may connect to networks via wired network connections such as Ethernet. The computing device may also include an input/output interface 107 providing interfaces to the user of the computing device, such as one or more screens, loudspeakers, a mouse, tactile surfaces, a keyboard etc. . . . . Such a computing device may for example be a smart chip, a mobile telephone, a tablet, or a personal computer.

In existing methods executing cryptographic algorithms and including white-box countermeasures, the simulated source of entropy, such as a Pseudo-Random Number Generator (PRNG), used for generating pseudo-random values used in the countermeasures is usually initialized using the message m to be processed by the cryptographic algorithm. Such an implementation is given for example in the European patent application 16306234.2. This initialization of the PRNG and providing this message m to the cryptographic algorithm are usually two independent operations, except they are supposed to use the same input value. As explained above, this makes it possible for an attacker to alter the initialization of the PRNG, in order to make it constant, without modifying the cryptographic algorithm execution. In the end it enables him to cancel the countermeasures and to get knowledge of secret information from the cryptographic algorithm execution, by performing a low-order DCA attack.

The main idea of the invention is to introduce a strong dependency between the initialization of the PRNG and the execution of the cryptographic algorithm, such that if an attacker modifies this initialization, it will also alter the execution of the cryptographic algorithm. Therefore, the attacker will not gain any useful information from its execution even if he managed to disable the white-box countermeasures based on values generated by the PRNG, unless he performs a higher-order DCA attack.

Figure 2:
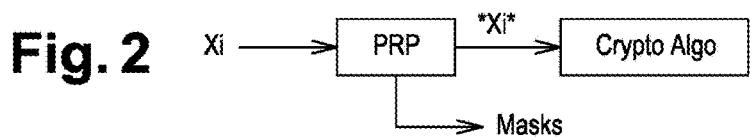
FIG. 2 is a schematic illustration of the core aspects of the present invention.

In order to do so, as shown on FIG. 2, a pseudo-random function is used for producing pseudo-random values to be used in countermeasures, and is supposed to be initialized with the message m to be processed by the cryptographic algorithm, as in existing methods; but this message m is not provided to the cryptographic algorithm independently of the execution of this pseudo-random function. Instead, a main output of the pseudo-random function is processed and provided as input to the cryptographic algorithm. This pseudo-random function and the processing applied to its main output shall be designed such that when the pseudo-random function is truly initialized using the message m, this message m, or a value derived from it to be processed by the cryptographic algorithm, can be easily retrieved from the main output by said processing. In that case, the correct input is provided to the cryptographic algorithm, as if the message m or the value derived from it to be processed by the cryptographic algorithm had been provided to it directly.

Using such a chained execution of the pseudo-random function and of the cryptographic algorithm, when an attacker modifies the initialization of the pseudo-random function, its main output is also modified, and the value obtained from the main output and provided to the cryptographic algorithm is not anymore what was supposed to be processed by it.

The pseudo-random function also includes an encryption of its main output value before it is output. The cryptographic algorithm shall be adapted accordingly for taking as input the encrypted value obtained by processing the encrypted main output value. By doing so, when an attacker alters the initialization of the source of entropy, even if the attacker manages to disable the countermeasures protecting the cryptographic algorithm, this algorithm is executed using as input an encrypted value, unrelated to the message m, and such that the corresponding decrypted value is unknown to the attacker. As a result the attacker cannot obtain any useful information from a low-order DCA attack targeting the execution of the cryptographic algorithm.

Figure 3:
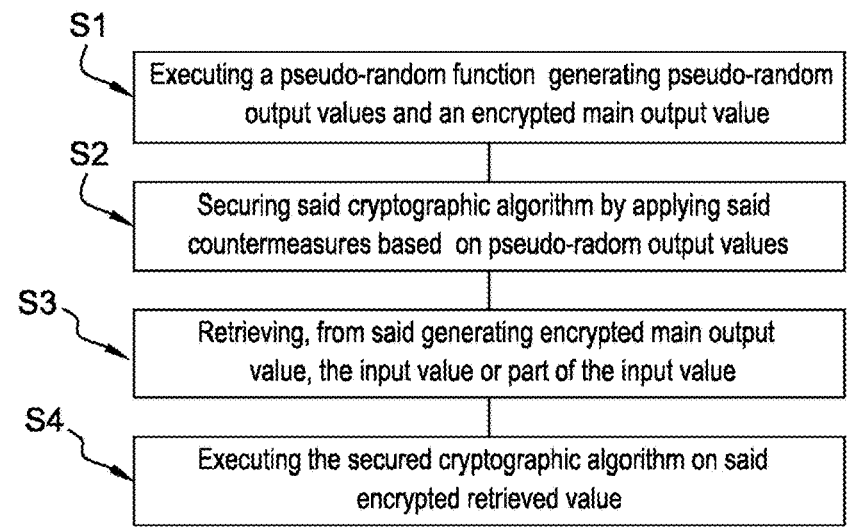
FIG. 3 illustrates schematically a method of secure execution of a whitebox cryptographic algorithm according to an embodiment of the present invention.

More precisely, the invention relates to a method for a secure execution of a whitebox cryptographic algorithm applied to a message m and protected by countermeasures based on pseudo-random values, comprising the steps described in FIG. 3. The cryptographic algorithm may be based on a blockcipher algorithm or may be a blockcipher algorithm such as AES or DES algorithm.

In an embodiment the whole cryptographic algorithm is protected by countermeasures. In another embodiment, the countermeasures are only applied to a subfunction of a cryptographic algorithm. As an example, in the case of DES algorithm, the method may only relate to the secure execution of the "Add Round Key" step, or of the "SubByte" step applying S-boxes, of the algorithm.

In a first step S1, the processor of the computing device may execute a pseudo-random function generating pseudo-random output values and an encrypted main output value based on an encrypted input value *Xi* derived from the message m. Depending on the kind of cryptographic algorithm to be performed, the input value may be derived from only a part of the message m, for example when the cryptographic algorithm only takes as input a chunk of the message m. As an example, the input message may be split in several words of size 64 bits or 128 bits depending on the cryptographic algorithm and the white-box countermeasures. The input value $X_i$ may be derived from one or more of such words. The encoded input value *$X_i$* may be split in several parts during the next steps and its size may vary during the execution of the cryptographic algorithm.

In a second step S2, the processor of the computing device may secure said cryptographic algorithm by applying to the cryptographic algorithm said countermeasures based on said generated pseudo-random output values. For example, when the cryptographic algorithm makes use of look up tables (LUTs), securing the cryptographic algorithm may comprise randomizing at least one of said lookup tables using said pseudo-random output values as masking values.

In a third step S3, the processor of the computing device may retrieve, from said generated encrypted main output value, the input value or part of the input value, under an encrypted form.

In a fourth step S4, the processor of the computing device may execute the secured cryptographic algorithm on said encrypted retrieved value.

In an exemplary embodiment, the whitebox cryptographic algorithm comprises at least one operation implemented using at least one encoded lookup table. An example of such an implementation of DES algorithm is given in "A White-Box DES Implementation for DRM Applications", Chow and al., Oct. 15, 2002, Pre-proceedings for ACM DRM-2002 workshop. In such a case, the encrypted retrieved value may be encrypted using an encoding corresponding to the encoding of said encoded lookup tables. By doing so, processing the encrypted retrieved value with an encoded LUT is equivalent to processing the input value Xi with the corresponding decoded LUT. In all the following paragraphs, the words "encrypted" and "encoded" have the same meaning and values protected by encryption/encoding are marked with stars. For example, the encoded version of the input value Xi is referred to using the notation *Xi*.

In an embodiment, the generated pseudo-random output values and main output value are also generated by the pseudo-random function based on at least one intermediate value *$Y_i$* obtained during a previous execution of the cryptographic algorithm. In order to avoid disclosing any information to an attacker, such an intermediate value is preferably manipulated in an encoded form only. In such an embodiment, during the third step S3, the processor may retrieve a value depending on both the input value $X_i$ and the intermediate value $Y_i$, noted $g(X_i, Y_i)$ with a typical choice of g that is $g(X_i,Y_i)=X_i \oplus Y_i$. In addition, the pseudo-random function may also take as input the last main output value generated by the pseudo-random function during its last execution.

The following paragraphs discuss in details several exemplary embodiments of the pseudo-random function. The pseudo-random function has an internal state S, which is initialized at the beginning of the first step using the values provided as input to the pseudo-random function, which are the input value *Xi* and optionally the intermediate value *Yi*, and the last main output value generated by the pseudo-random function. The encoded initial internal state of the pseudo-random function, at the beginning of the first step, for an ith execution round of the pseudo-random function, is noted *Si*.

In order to generate pseudo-random output values $R_{i,1}$, $R_{i,2}$ . . . used for the countermeasures to be applied during the second step S2, the execution of the pseudo-random function may comprise several executions of an update function modifying the internal state S of the pseudo-random function; and the pseudo-random output values may be the modified internal state of the pseudo-random function outputted by the update function. The internal state of the pseudo-random function after the jth execution of the update function during the ith execution round of the pseudo-random function is noted $S_{i,j}$.

The update function may vary between two rounds of execution of the pseudo-random function, and may also vary from one execution to another during a single execution of the pseudo-random function.

The encrypted main output value may be an output of the last execution of the update function for a given execution round of the pseudo-random function. Assuming that during the ith execution round, the update function is executed xi times, the main output value for this execution round is equal to $S_{i,xi}$.

Figure 4:
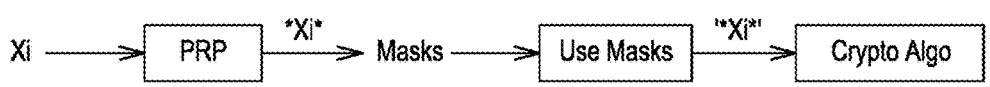
FIG. 4 is a schematic illustration of an embodiment of the present invention.

In an embodiment, depicted on FIG. 4, the input value or part of the input value to be used as an input to the cryptographic algorithm is retrieved from the pseudo-random output values $R_{i,1}$, $R_{i,2}$ ... used for the countermeasures. In other words, the main output value is composed of one or more of the pseudo-random output values. In the third step S3, the input value or part of the input value may be retrieved from the pseudo-random output values themselves, or from values derived from applying to the cryptographic algorithm said countermeasures based on said generated pseudo-random output values at the second step S2.

In a first exemplary embodiment, said update function is an encryption function ENC or a corresponding decryption function DEC and executing said pseudo random function comprises several executions of said encryption function using various keys in a specific order ($Key_1$, $Key_2$, ..., $Key_p$, $Key_{p+1}$, ... $Key_q$) followed by as many executions of said corresponding decryption function using said keys in a reverse order ($Key_q$, ..., $Key_{p+1}$, $Key_p$, ..., $Key_2$, $Key_1$).

With xi the number of execution of the update function for one execution of the pseudo-random function, supposed to be even, such an embodiment executes $x_i/2$ encryption mini-rounds followed by $x_i/2$ decryption mini-rounds such that the state $S_{i,xi}$ after the $x_i/2$ encryption mini-rounds and $x_i/2$ decryption mini-rounds contains the part of the input value $X_i$ or part of the value $g(X_i,Y_i)$ to be retrieved, with a typical choice of g that is $g(X_i,Y_i)=X_i \oplus Y_i$.

As an example, the update function may be a keyed non-linear permutation or one round of a block-cipher encryption, e.g. one encryption round of AES.

During the execution of the pseudo-random function, the values of the internal state of the pseudo-random function is never manipulated in cleartext, but always in an encoded form, e.g. the value $*S_i*$ is manipulated during the execution but not the value $S_i$.

The pseudo-random output values to be generated may be equal to the internal state of the pseudo-random function $S_{i,j}$ for some value of j detailed here under.

Typically, the flow may be the following
Initial state value: $*S_{i,0}* = *S_i*$
$*S_{i,1}* = ENC[*Key_1*](*S_{i,0}*)$ and there is no pseudo-random output value generated,
$*S_{i,2}* = ENC[*Key_2*](*S_{i,1}*)$ and there is no pseudo-random output value generated,
. . .
$*S_{i,t}* = ENC[*Key_p*](*S_{i,t-1}*)$ and the pseudo-random output value $R_j = *S_{i,t}*$ is generated,
$*S_{i,t+1}* = ENC[*Key_{p+1}*](R_j)$ and the pseudo-random output value $R_{j+1} = *S_{i,t+1}*$ is generated,
. . .
$*S_{i,(xi/2)}* = ENC[*Key_q*](R_{j+xi/2-t-1})$ and the pseudo-random output value $R_{j+xi/2-t} = *S_{i,(xi/2)}*$ is generated,
. . .
$*S_{i,(xi/2)+1}* = DEC[*Key_q*](R_{j+xi/2-t})$ and the pseudo-random output value $R_{j+xi/2-t+1} = *S_{i,(xi/2)+1}*$ is generated,
. . .
$*S_{i,xi-t-1}* = DEC[*Key_{p+1}*](R_{j+xi-2t-2})$ and there is no pseudo-random output value generated,
$*S_{i,xi-t}* = DEC[*Key_p*](*S_{i,xi-t-1}*)$ and there is no pseudo-random output value generated,
. . .
$*S_{i,xi-1}* = DEC[*Key_2*](*S_{i,xi-2}*)$ and there is no pseudo-random output value generated,
$*S_{i,xi}* = DEC[*Key_1*](*S_{i,xi-1}*)$ and there is no pseudo-random output value generated
$*S_{i+1}* = *S_{i,xi}*$.

At the end of the last mini-round, the part of the input value $X_i$ or part of $g(X_i,Y_i)$ to be retrieved may be extracted from the encrypted main output value $*S_{i+1}*$ and provided as an input to the cryptographic algorithm.

In a second exemplary embodiment, a master secret $k_i$ is split into $x_i$ secret shares $k_{i,1}$, $k_{i,2}$, ... $k_{i,xi}$ such that adding said master secret is equivalent to the identity operation. In such a second embodiment, said update function comprises adding one of said secret shares and each execution of the update function uses one of the secret shares such that all the secret shares are used once.

Each mini-round modifies the internal state of the pseudo-random function $S_{i,j}$ by a corresponding secret $k_{i,j}$ in such a way that after $x_i$ mini rounds all secrets have been used. The final state $S_{i,xi}$ could have been computed using master secret $k_i$ and therefore contains the part of the input value $X_i$ or part of $g(X_i,Y_i)$ to be retrieved. The master secret is not manipulated during the computation steps, only the secret shares are used.

For example, master secret $k_i = k_{i,1} + k_{i,2} + ... + k_{i,xi} = 0 \mod g$ may be used, where g is an integer such as for example $2^{128}$.

Initial state value: $*S_{i,0}* = *S_i*$
$*S_{i,1}* = *(S_{i,0}+k_{i,1} \mod g)*$ and there is no pseudo-random output value generated,
$*S_{i,2}* = *(S_{i,1}+k_{i,2} \mod g)*$ and there is no pseudo-random output value generated,
. . .
$*S_{i,t}* = *(S_{i,t-1}+k_{i,t} \mod g)*$ and the pseudo-random output value $R_j = *S_{i,t}*$ is generated,
$*S_{i,t+1}* = R_j*(+k_{i,t+1} \mod g)*$ and the pseudo-random output value $R_{j+1} = *S_{i,t+1}*$ is generated,
. . .
$*S_{i,q}* = R_{j+s-1}*(+k_{i,q} \mod g)*$ and the pseudo-random output value $R_{j+s} = *S_{i,t+s}*$ is generated,
$*S_{i,q+1}* = R_{j+s}*(+k_{i,q+1} \mod g)*$ and the pseudo-random output value $R_{j+s+1} = *S_{i,t+s+1}*$ is generated,
. . .
$*S_{i,xi}* = *(S_{i,xi-1}+k_{i,xi} \mod g)*$ and there is no pseudo-random output value generated,
$*S_{i+1}* = *S_{i,xi}*$ At the end of the last mini-round, the part of the input value $X_i$ or part of $g(X_i,Y_i)$ to be retrieved may be extracted from the encrypted main output value $*S_{i+1}*$ and provided as an input to the cryptographic algorithm.

In a third exemplary embodiment, said update function generates an output comprising:
a result of applying the identity function ID to a part of its input pofS, and
a result of an encryption ENC of its input using an encryption key Key.

Such an embodiment uses encryption as a pseudo-random function for updating part of the internal state $S_{i,j}$ of the pseudo-random function whereas the remaining part of $S_{i,j}$ is maintained constant by using the identity function. Since all the intermediate values are manipulated using secret encodings and that these secret encodings can vary depending on the step of computation, it is not necessary visible even by observing the successive values of the internal state that the identity function is used to propagate the same values during several executions of the update function. Then, at the end of the last execution of the update function, the part of the value $S_i$ that has been propagated though the use of the identity function can be extracted to be provided as an input to the cryptographic algorithm.

Typically, the flow may be the following where "pof" stands for "part of" in the next formulas:
Initial state value: $*S_{i,0}* = *S_i*$ $*S_{i,1}* = *\{ID[*pofS_{i,0}*], ENC[*Key_1*](*S_{i,0}*)\}*$ and there is no pseudo-random output value generated,
$*S_{i,2}* = *\{ID[*pofS_{i,1}*], ENC[*Key_2*](*S_{i,1}*)\}*$ and there is no pseudo-random output value generated,
...
$*S_{i,t}* = *\{ID[*pofS_{i,t-1}*], ENC[*Key_p*](*S_{i,t-1}*)\}*$ and the pseudo-random output value $R_j = *S_{i,t}*$ is generated,
$*S_{i,t+1}* = *\{ID[*pofS_{i,t}*], ENC[*Key_{p+1}*](R_j)\}*$ and the pseudo-random output value $R_{j+1} = *S_{i,t+1}*$ is generated,
...
$*S_{i+1}* = *S_{i,xi}*$ At the end of the last mini-round, the part of the input value Xi or part of g(Xi,Yi) to be retrieved may be extracted from the encrypted main output value $*S_{i+1}*$ and provided as an input to the cryptographic algorithm.

Finally, according to a second aspect of the invention, the invention relates to a computer program product directly loadable into the memory of at least one computer, comprising software code instructions for performing by a computer's processor the steps of the method according to the first aspect when said product is run on the computer.

The method described here above thus enables to impose strong ties between white-box countermeasures and the input of the cryptographic algorithm, such that modifying the initialization of the PRNG producing the pseudo-random values used for the countermeasures leads to modifying the input value provided to the cryptographic algorithm.

The invention claimed is:

1. A method for a secure execution of a cryptographic algorithm in a whitebox environment, applied to a message and protected by countermeasures based on pseudo-random values, comprising the steps of:
    executing a pseudo-random function generating pseudo-random output values and an encrypted main output value based on an encrypted input value derived from said message,
    securing said cryptographic algorithm by applying to the cryptographic algorithm said countermeasures based on said generated pseudo-random output values by using said pseudo-random output values as masking values,
    retrieving, from said generated encrypted main output value, the input value or part of the input value, under an encrypted form,
    executing said secured cryptographic algorithm on said encrypted retrieved value.

2. The method of claim 1, wherein said cryptographic algorithm is based on a blockcipher algorithm.

3. The method of claim 1, wherein said cryptographic algorithm comprises at least one operation implemented using at least one encoded lookup table and wherein said encrypted retrieved value is encrypted using an encoding corresponding to the encoding of said encoded lookup tables.

4. The method of claim 3 wherein using said pseudo-random output values as masking values randomizes at least one of said lookup tables.

5. The method of claim 1, wherein said pseudo-random output values and said main output value are also generated by the pseudo-random function based on at least one intermediate value obtained during a previous execution of the cryptographic algorithm.

6. The method of claim 1, wherein executing said pseudo-random function comprises several executions of an update function, wherein at least one of said pseudo-random output values is an output of said update function, and said encrypted main output value is an output of the last execution of the update function.

7. The method of claim 6, wherein said update function is an encryption function or a corresponding decryption function, wherein executing said pseudo random function comprises several executions of said encryption function using various keys in a specific order followed by as many executions of said corresponding decryption function using said keys in a reverse order.

8. The method of claim 6, wherein a master secret is split into secret shares such that adding said master secret is equivalent to an identity operation, wherein said update function comprises adding one of said secret shares, and wherein, each execution of the update function uses one of the secret shares such that all the secret shares are used once.

9. The method of claim 6, wherein said update function generates an output comprising a result of applying an identity function to a part of its input, and comprising a result of an encryption of its input using an encryption key.

10. A non-transitory memory comprising a computer program product having software code instructions executable by a processor of the computer, the software code instructions for causing the processor to perform the steps of a method including the steps of:
    method for a secure execution of a cryptographic algorithm in a whitebox environment, applied to a message and protected by countermeasures based on pseudo-random values, comprising the steps of:
    executing a pseudo-random function generating pseudo-random output values and an encrypted main output value based on an encrypted input value derived from said message,
    securing said cryptographic algorithm by applying to the cryptographic algorithm said countermeasures based on said generated pseudo-random output values by using said pseudo-random output values as masking values,
    retrieving, from said generated encrypted main output value, the input value or part of the input value, under an encrypted form,
    executing said secured cryptographic algorithm on said encrypted retrieved value.

11. A device comprising a memory, an interface and a processor configured to perform a method for a secure execution of a cryptographic algorithm in a whitebox environment, applied to a message (m) and protected by countermeasures based on pseudo-random values, comprising the steps of:
    executing a pseudo-random function generating pseudo-random output values and an encrypted main output value based on an encrypted input value derived from said message,
    securing said cryptographic algorithm by applying to the cryptographic algorithm said countermeasures based on said generated pseudo-random output values by using said pseudo-random output values as masking values,
    retrieving, from said generated encrypted main output value, the input value or part of the input value, under an encrypted form,
    executing said secured cryptographic algorithm on said encrypted retrieved value.

12. The device of claim 11, wherein said cryptographic algorithm is based on a blockcipher algorithm.

13. The device of claim 11, wherein said cryptographic algorithm comprises at least one operation implemented using at least one encoded lookup table and wherein said encrypted retrieved value is encrypted using an encoding corresponding to the encoding of said encoded lookup tables.

14. The device of claim 13 wherein using said pseudo-random output values as masking values randomizes at least one of said lookup tables.

15. The device of claim 11, wherein said pseudo-random output values and said main output value are also generated by the pseudo-random function based on at least one intermediate value obtained during a previous execution of the cryptographic algorithm.

16. The device of claim 11, wherein executing said pseudo-random function comprises several executions of an update function, wherein at least one of said pseudo-random output values is an output of said update function, and said encrypted main output value is an output of the last execution of the update function.

17. The device of claim 16, wherein said update function is an encryption function or a corresponding decryption function, wherein executing said pseudo random function comprises several executions of said encryption function using various keys in a specific order followed by as many executions of said corresponding decryption function using said keys in a reverse order.

18. The device of claim 16, wherein a master secret is split into secret shares such that adding said master secret is equivalent to an identity operation, wherein said update function comprises adding one of said secret shares, and wherein, each execution of the update function uses one of the secret shares such that all the secret shares are used once.

19. The device of claim 16, wherein said update function generates an output comprising a result of applying an identity function to a part of its input, and comprising a result of an encryption of its input using an encryption key.

* * * * *